(12) United States Patent
Holmes (10) Patent No.: US 7,574,274 B2
(45) Date of Patent: Aug. 11, 2009

(54) METHOD AND SYSTEM FOR SYNCHRONIZING AUDIO PROCESSING MODULES

(75) Inventor: Stephen G. Holmes, Seattle, WA (US)

(73) Assignee: NVIDIA Corporation, Santa Clara, CA (US)

( * ) Notice: Subject to any disclaimer, the term of this patent is extended or adjusted under 35 U.S.C. 154(b) by 764 days.

(21) Appl. No.: 10/824,759

(22) Filed: Apr. 14, 2004

(65) Prior Publication Data

US 2005/0234571 A1   Oct. 20, 2005

(51) Int. Cl.
G06F 17/00 (2006.01)
(52) U.S. Cl. .......................................... 700/94; 713/600
(58) Field of Classification Search ................... 700/94
See application file for complete search history.

(56) References Cited

U.S. PATENT DOCUMENTS

| | | | |
|---|---|---|---|
| 3,173,022 A | 3/1965 | Kunsch, Jr. | |
| 5,434,926 A | 7/1995 | Watanabe et al. | |
| 5,873,354 A | 2/1999 | Charlton et al. | 395/881 |
| 5,875,354 A | 2/1999 | Charlton et al. | |
| 6,005,901 A * | 12/1999 | Linz | 375/355 |
| 6,226,758 B1 * | 5/2001 | Gaalaas et al. | 713/600 |
| 6,260,011 B1 | 7/2001 | Heckerman et al. | |
| 6,292,854 B1 | 9/2001 | Priem | 710/22 |
| 6,996,445 B1 | 2/2006 | Kamijo | |
| 7,216,221 B2 | 5/2007 | Bear et al. | |
| 7,348,483 B2 | 3/2008 | Puryear | |
| 7,376,475 B2 | 5/2008 | Fay et al. | |
| 2002/0012324 A1 | 1/2002 | Hayward | 370/286 |
| 2002/0107594 A1 | 8/2002 | Taylor et al. | |
| 2004/0071132 A1 * | 4/2004 | Sundqvist et al. | 370/352 |
| 2004/0161126 A1 | 8/2004 | Rosen et al. | |
| 2004/0264714 A1 | 12/2004 | Lu et al. | |

FOREIGN PATENT DOCUMENTS

EP   0869443 A2   10/1998

(Continued)

OTHER PUBLICATIONS

Analog Devices, Inc. "192 kHz Stereo Asynchronous Sample Rate Converter" AD1895- Specifications, Sep. 2002, XP002340804 Norwood, MA, USA.

(Continued)

*Primary Examiner*—Walter F Briney, III (57) ABSTRACT

Embodiments of the present invention provide an audio system having wholly independent audio processing modules. The audio system includes a plurality of audio processing modules, a clock manager, a sample rate converter and a buffer. The audio processing modules are communicatively coupled to the clock manager and the buffer. The sample rate converter is communicatively coupled to the clock manager and the buffer. The buffer provides for storing audio data generated and consumed by the audio processing modules. The clock manager provides for determining the clock source of each audio processing module. The clock manager also provides for configuring the audio processing modules and the sample rate converter as a function the clock source of each audio processing module. The sample rate converter provides for synchronizing a flow rate of audio data generated by a first audio processing module and a flow rate of audio data consumed by a second audio processing module, when the clock source of the first and second audio processing modules are different.

22 Claims, 6 Drawing Sheets

FOREIGN PATENT DOCUMENTS

| TW | 481782 | 10/2000 |
|---|---|---|
| WO | 02/052240 A1 | 7/2002 |

OTHER PUBLICATIONS

Young M., "A Digital Audio Production System" Broadcasting Convention, 1995. IBC 95, International Amsterdam, NL, London, UK, IEE, UK, 1995, pp. 202-207, XP006528928 ISBN: 0-85296-644-X, the whole document.

Nvidia; Featured Technology Nvidia nForce Platform Processors; 2 pages; http://www.nvidia.com/object/nppa.html, Feb. 15, 2004.

Nvidia; Featured Technology Audio Processing Unit (APU); 2 pages; http://www.nvidia.com/object/apu.html, Feb. 15, 2004.

Nvidia; Featured Technology; Nvidia SoundStorm; 2 pages; http://www.nvidia.com/object/feature_soundstorm.html, Feb. 15, 2004.

Nvidia; Featured Technology Digital Media Gateway; 2 pages http://www.nvidia.com/object/feature_dmg.html, Feb. 15, 2004.

Intel: Intel 875P Chipset; 2 pages; http://www.intel.com/design/chipsets/875P/index.htm, Feb. 4, 2004.

Nvidia; Nvidia's New Motherboard Chipset; 3 pages; http://www.pcquest.com/content/technology/101071401.asp, Feb. 15, 2004.

Nvidia; Technical Brief Nvidia nForce Platform Processing Architecture; 2001; 9 pages; www.nvidia.com.

Nvidia; Technical Brief Nvidia nForce Platform Processors Audio Processing Unit; 2002; 10 pages; www.nvidia.com.

Nvidia; Technical Brief Nvidia nForce2 MCP-T Digital Media Gateway; 2002; 9 pages; www.nvidia.com.

* cited by examiner

METHOD AND SYSTEM FOR SYNCHRONIZING AUDIO PROCESSING MODULES

BACKGROUND OF THE INVENTION

Legacy computing devices were utilized to create documents, spreadsheets, and e-mails. Such computing devices provided monophonic sounds, which were utilized primarily to indicate occurrences of system events. Computing devices are now also used to play games, surf the Internet, listen to music, watch movies and the like. Accordingly, conventional computing devices provide multi-channel audio capabilities.

Figure 1:
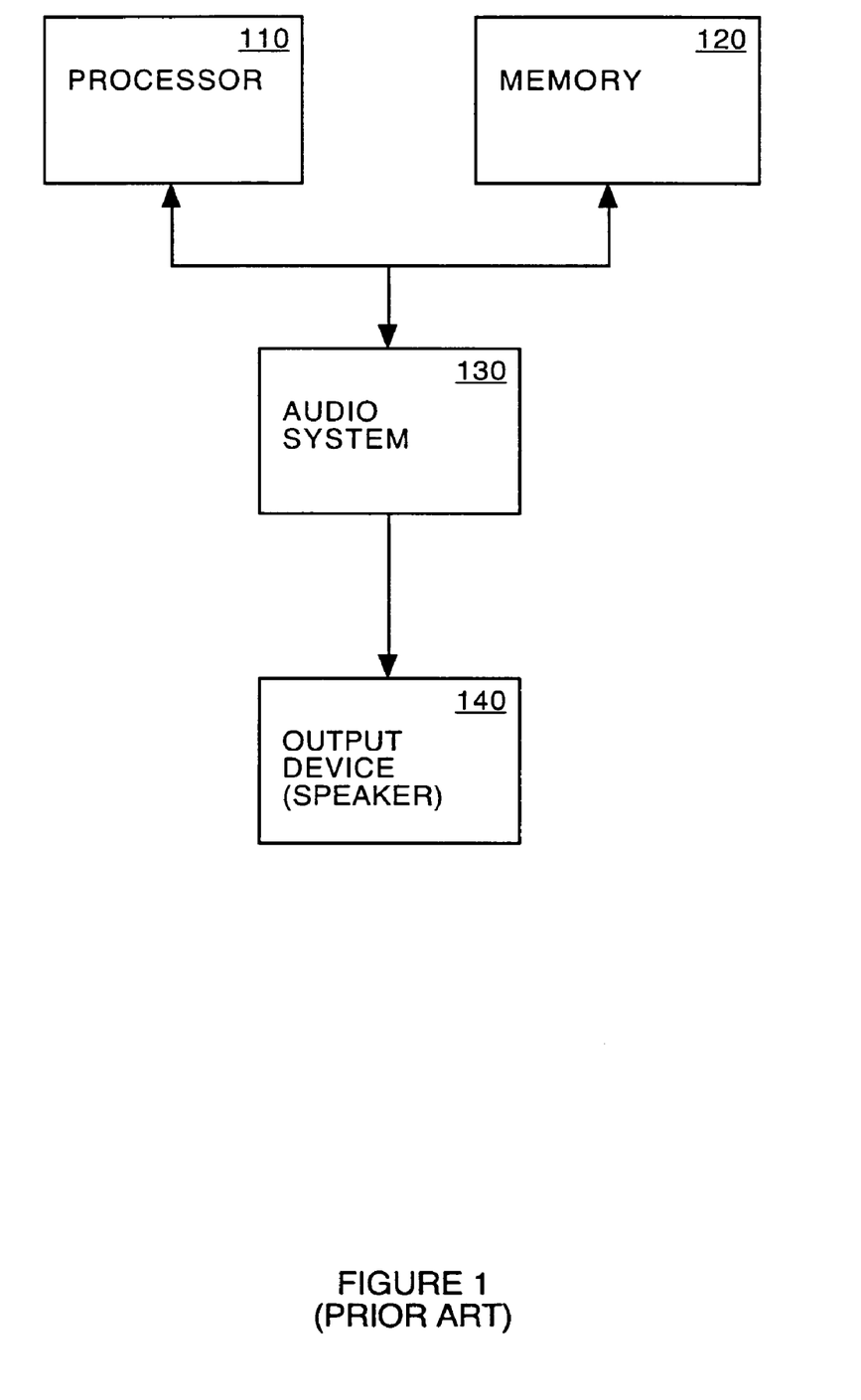
FIG. 1 shows a block diagram of an audio portion of a computer system, in accordance with the prior art.

Referring to FIG. 1, a block diagram of an audio portion of a computer system, in accordance with the conventional art, is shown. As depicted in FIG. 1, the computer includes a processor 110, a memory 120, an audio system 130 and an output device (e.g., speaker) 140. The audio system 130 is communicatively coupled between the processor 110, memory 120 and output device 140.

The processor 110 provides an operating system and one or more applications. One or more of the applications may cause the processor 110 to provide one or more sounds. The processor 110 issues commands to the audio system 130 which contain the location in memory 120 (e.g., an address) of one or more wave tables to be played and parameters to be used to play the sounds. The wave table consists of a series of digital samples of a sound. The parameters may include the frequency (e.g., pitch) of the sound to be generated from the wave table, the envelope (e.g., attack, sustain, decay) describing the amplitude of the sound through time, and a tremolo to modulate the frequency. The audio system 130, in response to commands from the processor 110, retrieves one or more sounds from the wave tables stored in memory 120. The audio system 130 processes the sounds according to the parameters, thereby generating audio data. The audio system 130 then converts the audio data to an analog output which may be played on a given output device (e.g., speaker) 140.

It is expected that computer users will continue to demand improved audio systems for delivering high definition video, high definition audio, streaming video, streaming audio, multiplayer games, and/or other on-demand audio and video content. Accordingly, the audio system needs to provide ever increasing audio processing capabilities while minimizing processor utilization and bus traffic. Therefore, an improved audio system capable of processing multiple sounds, from a plurality of applications, which can be output to any number of output devices, with reduced processor utilization, reduced generation of bus traffic and reduced latency, is needed.

SUMMARY OF THE INVENTION

Embodiments of the present invention are directed toward an improved audio system capable of processing multiple sounds, from a plurality of applications, which can be output to any number of output devices, with reduced processor utilization, reduced generation of bus traffic and reduced latency. In one embodiment, the audio system includes a plurality of audio processing modules, a clock manager, a sample rate converter and a buffer. The audio processing modules are communicatively coupled to the clock manager and the buffer. The sample rate converter is communicatively coupled to the clock manager and the buffer. The buffer provides for storing audio data generated and consumed by the audio processing modules. The clock manager provides for determining the clock source of each audio processing module. The clock manager also provides for configuring the audio processing modules and the sample rate converter as a function the clock source of each audio processing module. The sample rate converter provides for synchronizing a flow rate of audio data generated by a first audio processing module and a flow rate of audio data consumed by a second audio processing module, when the clock source of the first and second audio processing modules are different.

In another embodiment, a method for synchronizing audio processing modules of an audio system includes configuring a first one of an associated set of audio processing modules (e.g., an audio hardware accelerator) to pass a first set of audio data through a buffer to a second one of the associated set of audio processing modules (e.g., an audio hardware renderer), when the set of audio processing modules utilize a common clock source. Therefore, when the two or more devices are found to have the same clock source (e.g., hardware clock), the software can then bypass the need to introduce rate control or sample rate converters between devices to prevent the underflow or overflow of data. When the set of audio processing modules do not utilize the common clock source, the method includes configuring the first one of the associated set of audio processing modules to store the first set of audio data in a first buffer. The sample rate converter is configured to receive the first set of audio data from the first buffer and to store a second set of audio data in a second buffer. The sample rate converter is also configured to synchronize a flow rate of the first set of audio data into the first buffer with a flow rate of the second set of audio data out of the second buffer. The second one of the associated set of audio processing modules is configured to receive the second set of audio data from the second buffer, when the set of audio processing modules do not utilize a common clock source.

In another embodiment, a method for synchronizing audio processing modules includes operating the audio system in a first mode, when an associated set of audio processing modules share a common clock source. The first mode includes storing audio data generated by a first one of the associated set of audio processing modules in a shared buffer. The first mode further includes receiving audio data consumed by a second one of the associated set of audio processing modules from the shared buffer. The audio system is operated in a second mode, when the associated set of audio processing modules do not share a common clock source. The second mode includes, storing audio data generated by the first one of the associated set of audio processing modules in an input buffer and receiving the audio data consumed by the second one of the associated set of audio processing modules from an output buffer. The second mode further includes synchronizing the flow rate of audio data being stored in the input buffer with the flow rate of audio data being received from the output buffer.

In another embodiment, a computing device implemented audio system includes a memory controller hub, a processor, a main memory and an audio system. The processor, main memory and audio system are each communicatively coupled to the memory controller hub. The audio system includes a clock manager, a plurality of audio processing modules, a sample rate converter and a buffer. The plurality of audio processing modules are communicatively coupled to the clock manager and the buffer. The sample rate converter is communicatively coupled to the clock manager and the buffer.

Embodiments of the present invention advantageously allow audio processing modules to act as wholly independent devices. Embodiments of the present invention advantageously synchronize the audio processing modules when they do not share a common clock source. When the audio processing modules share a common clock source, the overhead of synchronizing the audio processing modules may be eliminated by embodiments of the present invention.

BRIEF DESCRIPTION OF THE DRAWINGS

The present invention is illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present invention, numerous specific details are set forth in order to provide a thorough understanding of the present invention. However, it is understood that the present invention may be practiced without these specific details. In other instances, well-known methods, procedures, components, and circuits have not been described in detail as not to unnecessarily obscure aspects of the present invention.

Figure 2:
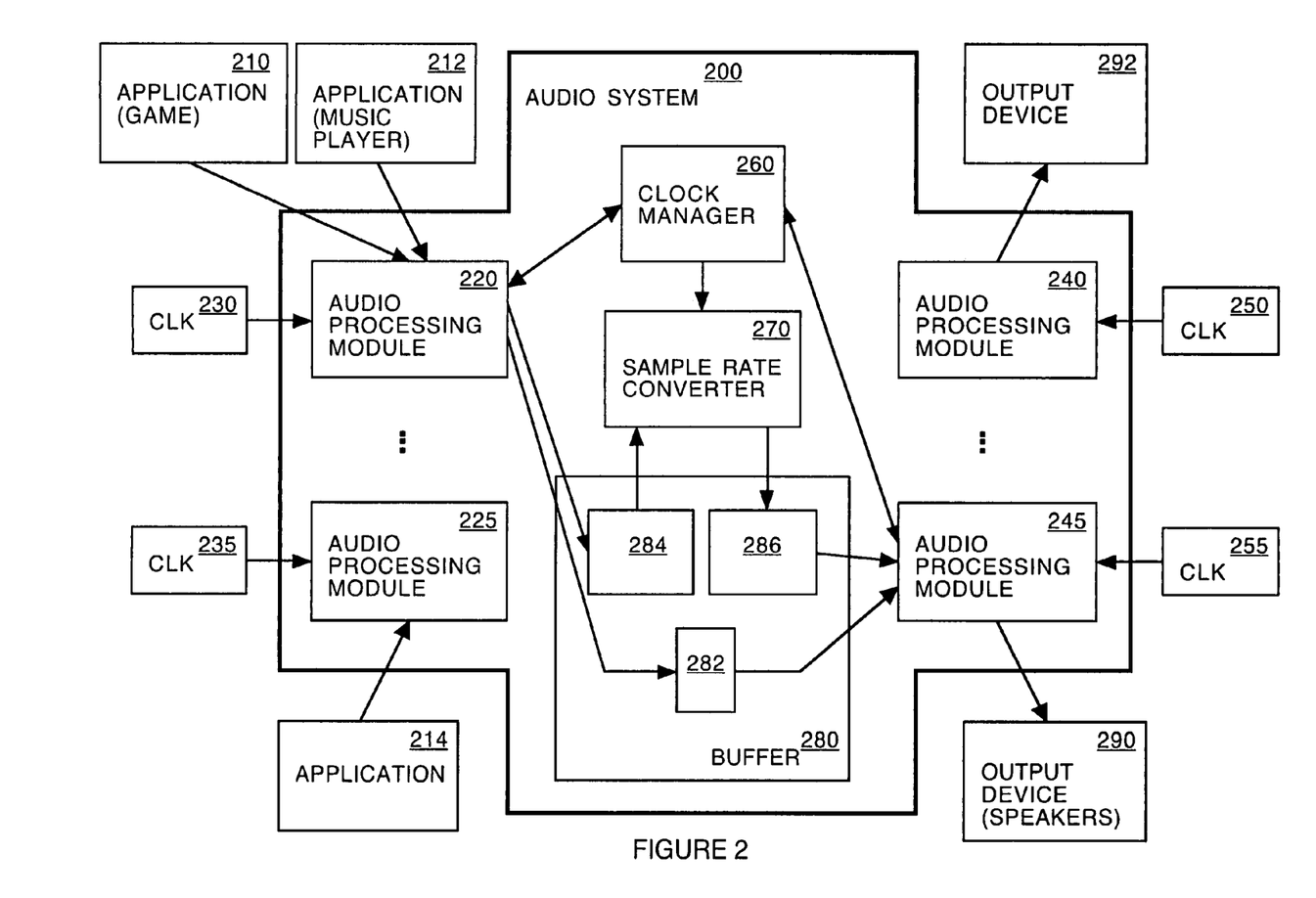
FIG. 2 shows a block diagram of an electronic audio system, in accordance with one embodiment of the present invention.

Referring to FIG. 2, a block diagram of an electronic audio system 200, in accordance with one embodiment of the present invention, is shown. As depicted in FIG. 2, the audio system 200 is coupled between one or more applications (e.g., music player, game, and/or the like) 210, 212, 214 and one or more output devices (e.g., speaker, PCI controller, USB controller, firewire controller and/or the like) 290, 292. Generally, a particular application 210 generates one or more sounds. The sounds are processed by the audio system 200 and output to an appropriate output device 290.

The audio system 200 includes a plurality of audio processing modules 220, 225, 240, 245, a clock manager 260, a sample rate converter 270, and a buffer 280. The audio processing modules 220, 225, 240, 245 may be communicatively coupled to the clock manager 260 and to the buffer 280. The sample rate converter 270 may be communicatively coupled to the clock manager 260 and to the buffer 280.

In one implementation, a first audio processing module may be an accelerator module and a second audio processing module may be a renderer module, as described in detail below with respect to FIG. 3. In another implementation, a first audio processing module may be a local stage and a second audio processing module may be a global stage, as described in detail below with respect to FIG. 4.

One or more audio processing modules (e.g., an accelerator module and a renderer module, or a local stage and a global stage) 220, 245 may be associated with each other for processing sounds generated by a particular application 210. When associated audio processing modules 220, 245 are operating from different clock sources 230, 255 the rate of generation and consumption of audio data will differ. Even if two audio processing modules 220, 245 are operating from different clock sources that are operating at the same rate, there will be some drift (e.g., 48.1 KHz and 47.9 KHz). When the audio processing modules 220, 245 are operating from the same clock source 230, the clock rates exactly match (e.g., 48 KHz).

In accordance with an embodiment of the present invention, the clock manager 260 configures the audio processing modules 220, 245 and the sample rate 270 converter as a function of the clock source 230, 250 of each of the audio processing modules 220, 245. If the associated audio processing modules 220, 245 share a common clock source 230, the audio processing modules 220, 245 are configured by the clock manager 260 to store and retrieve audio data, respectively, in a shared buffer 282. If the associated audio processing modules 220, 245 do not operate from a common clock source 230, 255, the first audio processing module 220 is configured by the clock manager 260 to store its output audio data in an input buffer 284. The second audio processing module 245 is configured by the clock manager 260 to receive audio data from an output buffer 286. The sample rate converter 270 is configured by the clock manager 260 to modify the audio data by inserting and/or deleting extra samples in the audio data, thereby synchronize the flow rate of audio data stored in the input buffer 284 and the flow rate of audio data received from the output buffer 286.

Alternatively, the sample rate converter 270 may provide generation/consumption rate matching by monitoring an input pointer of a shared buffer and an output pointer of the shared buffer. The sample rate converter 270 may cause the first audio processing module 220 and/or the second audio processing module 245 to speed up or slow down depending upon the input and output pointer values. Thus, the output rate of the second audio processing module 245 is matched to the input rate of the first audio processing module 220, so that the two remain locked in synchronization.

It is appreciated that, in another implementation, a plurality of audio processing modules 220, 225 may generate audio data corresponding to sounds received by each audio processing module 220, 225. A single audio processing module 245 may consume the audio data. In another implementation, a single audio processing module 220 may generate audio data corresponding to one or more received sounds. A plurality of audio processing modules 240, 245 may consume the audio data. In yet another implementation, a first plurality of audio processing modules 220, 225 may generate audio data corresponding to one or more received sounds. A second plurality of audio processing modules 240, 245 may consume the audio data.

Figure 3:
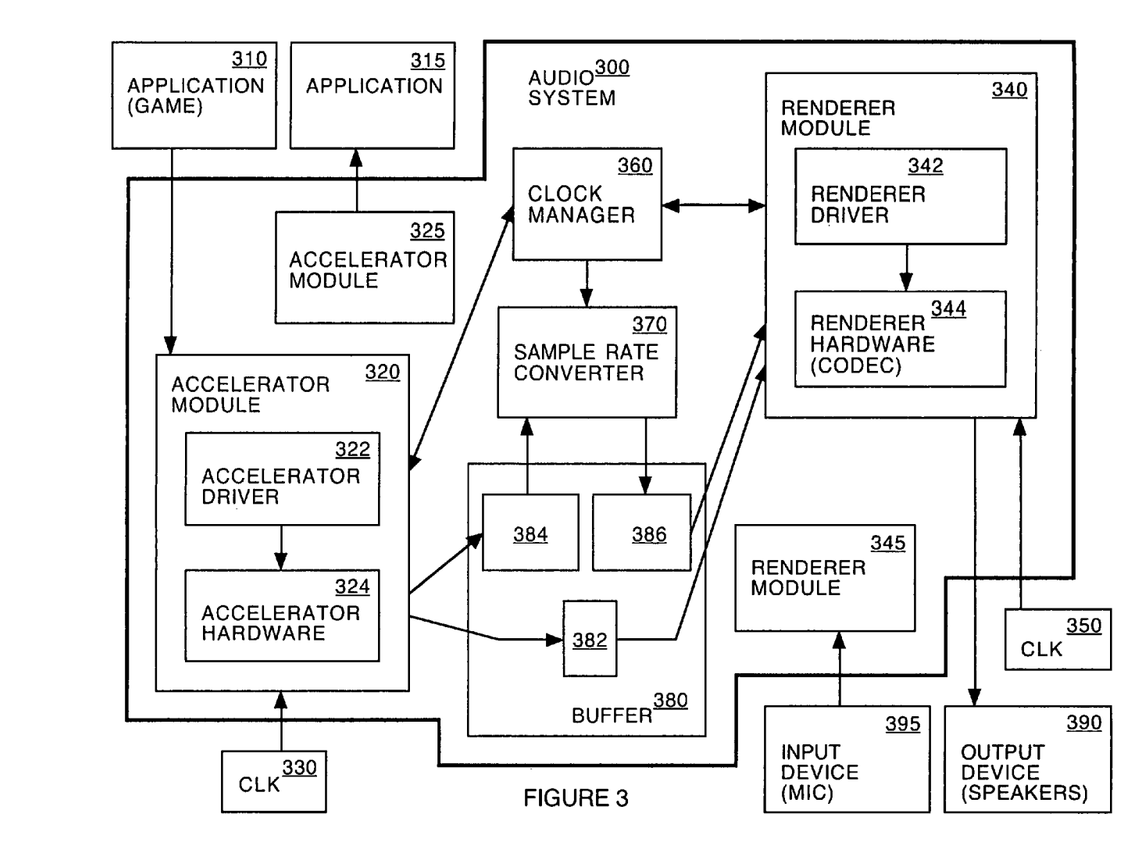
FIG. 3 shows a block diagram of an audio system including one or more accelerators and renderers, in accordance with one embodiment of the present invention.

Referring now to FIG. 3, a block diagram of an audio system 300 including one or more accelerators 320, 325 and renderers 340, 345, in accordance with one embodiment of the present invention, is shown. As depicted in FIG. 3, the audio system 300 may be coupled between one or more applications 310, 315 and one or more output devices 390. Generally, a particular application 310 generates one or more sounds. The sounds are processed by the audio system 300 and output to an appropriate output device 390.

The audio system 300 may include a plurality of audio processing modules 320, 325, 340, 345, a clock manager 360, a sample rate converter 370 and a buffer 380. One or more of the audio processing modules may be accelerator modules 320, 325. One or more of the audio processing modules may be renderer modules 340, 345. A particular accelerator module 320 is typically associated with a particular renderer module 340 for processing sounds from a particular application 310. The associated accelerator and renderer modules 320, 340 may be communicatively coupled to the clock manager 360 and the buffer 380. The sample rate converter 370 may be communicatively coupled to the clock manager 360 and the buffer 380.

The flow rate of audio data generated or consumed by the associated accelerator and renderer modules 320, 340, respectively, is a function of a clock driving the given module. Each associated clock may be from a different clock source 330, 350, or one or more of the associated clocks may be from the same clock source 330. If the clock sources 330 are the same for a set of associated accelerator and renderer modules 320, 340, the rate of audio data generated and consumed will be equal. If the clock sources 330, 350 are different for a set of associated accelerator and renderer modules 320, 340, the rate of audio data generated and consumed will not be equal. Even if two clocks sources 330, 350 are operating at the same frequency there will be some drift in the operating frequency, and therefore the rate of generation and consumption by the associated accelerator and renderer modules 320, 340 will vary. Only when the accelerator and renderer modules 320, 340 are operating from the same clock 330 source will the operating frequency match, and therefore the rate of generation and consumption between associated modules 320, 340 will also match.

Accordingly, the clock manager 360 may determine the clock source 330, 350 of each associated accelerator and renderer module 320, 340. In one implementation, each accelerator and renderer module 320, 340 registers a global unique identifier (GUID) with the clock manager 360. Each GUID identifies the clock source of the particular accelerator or renderer module. The clock manager 360 then configures each associated accelerator and renderer module 320, 340 and the sample rate converter 370 based in part upon the clock source 330 of the associated accelerator module 320 and the clock source 350 of the associated renderer module 340.

When associated accelerator and renderer modules 320, 340 are found to use the same clock source 330 (e.g., 48 KHz), the clock manager 360 configures the accelerator module 320 to operate in a first mode. In the first mode, the accelerator module 320 outputs its audio data to a shared portion of the buffer 382. The associated rendered module 340 is configured to receive its input audio data from the shared portion of the buffer 382. Thus, the accelerator module 320 outputs audio data directly to the shared portion of the buffer 382 from which the renderer module 340 consumes audio data. In the first mode, the latency between the output of audio data by the accelerator module 320 and the input of the audio data by the renderer 340 module is approximately 2 ms or less. In one implementation, the shared portion of the buffer 382 may be approximately 1-10 KB.

When the associated accelerator and renderer modules 320, 340 use different clock sources 330, 350, the clock manager 360 configures the modules 320, 340 and sample rate converter 370 to operate in a second mode. In the second mode, the associated accelerator module 320 is configured to output its audio data to an input portion of the buffer 384. The associated rendered module 340 is configured to receive its input audio data from an output portion of the buffer 386. The sample rate converter 370 is configured to match the flow rate into the input portion of the buffer 384 and out of the output portion of the buffer 386. Accordingly, the sample rate converter 370 retrieves the audio data from the input portion of the buffer 384 and may introduce and/or eliminated extra data samples. The sample rate converter 370 then outputs the modified audio data to the output portion of the buffer 386. Thus, the output rate of the accelerator module 320 is matched to the input rate of the renderer module 340, so that the two remain locked in synchronization. In the second mode, when sample rate conversion is utilized, the latency between the output of audio data from an accelerator module 320 to the input by a renderer module 340 is typically approximately 15-20 ms. In one implementation, the input portion and output portion of the buffer 384, 386 may be approximately 100-200 KB each.

It is appreciated that the audio system may be implemented in hardware, software, firmware, or a combination thereof. For example, the accelerator module, the clock manager and sample rate converter may be implemented in software. The renderer module may include a renderer driver, implemented in software, and renderer hardware (e.g., encoder/decoder (CODEC)). The buffer may be implemented in system memory (e.g., dynamic random access memory (DRAM)).

Although the operation of the audio system 300 has been described with reference to audio output streams (e.g., playback), it is appreciated that the audio system 300 may also provide for processing input streams (e.g., recording). For example, the renderer module (e.g., CODEC) 345 may receive an analog audio signal from an input device (e.g., microphone) 395. The renderer module 345 may convert the analog audio signal into digital audio data, which is stored in the buffer 380. The clock manager 360 configures the accelerator module 325, renderer module 345, sample rate converter 370 and buffer 380 as a function of the clock source 330, 350 of the renderer and accelerator modules 325, 345. If the renderer and accelerator modules 325, 345 do not operate from a common clock source the sample rate converter is inserted to synchronize the flow rate of data between the accelerator and renderer modules 325, 345. The accelerator module 325 receives the audio data from the buffer 380 and processes the audio data according to a given application 315. The processed audio data is then typically stored in main memory and/or in a bulk storage device (e.g., hard drive) for future playback.

Figure 4:
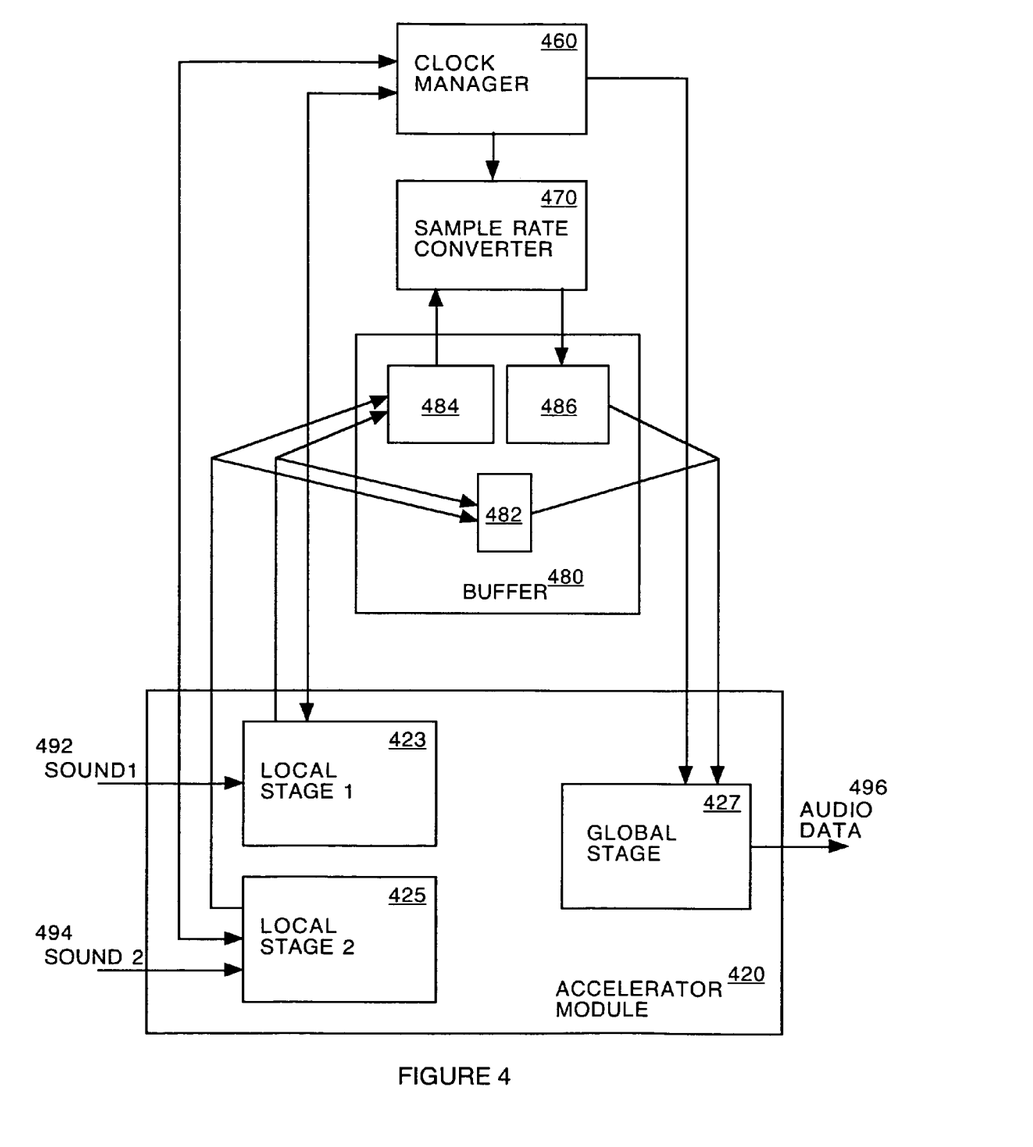
FIG. 4 shows a block diagram of an audio system including one or more local stages and a global stage, in accordance with one embodiment of the present invention.

Referring now to FIG. 4, a block diagram of an audio system including one or more local stages 423, 425 and a global stage 427, in accordance with one embodiment of the present invention, is shown. As depicted in FIG. 4, the audio system includes an accelerator module 420, a clock manager 460, a sample rate converter 470, a buffer 480 and a renderer (not shown). The accelerator module 420 includes one or more local stages 423, 425 and a global stage 427. The local stages 423, 425 and the global stage 427 are each communicatively coupled to the clock manager 460 and the buffer 480. The sample rate converter 470 is communicatively coupled to the clock manager 460 and the buffer 480. The clock manager 460 configures the local stages 423, 425, global stage 427 and the sample rate converter 470 as a function of the clock source of each of the local stages 423, 425 and the global stage 427.

Each of the local stage 423, 425 and the global stage 427 register a global unique identifier (GUID) with the clock manager 460. The GUID identifies the source of the clock of each local stage 423, 425 and the global stage 427. Thereafter, one or more local stages 423, 425 receive sounds from one or more applications and generate audio data corresponding to the one or more sounds. If a particular local stage 423 and the global stage 427 share a common clock source, the local stage 423 and the global stage 427 are configured by the clock manager 460 to store and retrieve audio data, respectively, in a shared portion of the buffer 482. If a particular local stage 423 and the global stage 427 operate from different clock sources, the clock manager 460 configures the local stage 423 to output its audio data to an input portion of the buffer 484. The global stage 427 is configured to receive its input audio data from an output portion of the buffer 486. The sample rate converter 470 is configured to receive the audio data from the input portion of the buffer 484 and introduce and/or eliminated extra data samples. The sample rate converter 470 then outputs the modified audio data to the output portion of the buffer 486. Thus, synchronization is maintained between the local stage 423 and the global stage 427.

For example, an application (e.g., video game) may be generating a plurality of sounds (a gun shot, a scream, a train, etc.). A particular local stage 423 corresponding to the application mixes the plurality of sounds and outputs it to the buffer 480. The sample rate converter 470 synchronizes the flow rate of audio data generated by the local stage 423 with the flow rate of audio data consumed by the global stage 427, when the stages do not have a common clock source. Otherwise, the local stage 423 stores audio data in the shared portion of the buffer 482 and the global stage 427 consumes the audio data without the need for synchronization, when the stages 423, 427 have a common clock source. The global stage may provide processing upon the audio data, such as reverb. The audio data output by the global stage 427 may be stored in a buffer for consumption by one or more renderer modules.

In another example, the buffer 480 stores the audio data generated by each of the plurality local stages 423, 425 and consumed by the global stage 427. The sample rate converter 470 synchronizes the flow rate of audio data generated by the local stages 423, 425 with the flow rate of audio data consumed by the global stage 427, when one or more stages do not have a common clock source. Otherwise, the local stages 423, 425 store audio data in the buffer 480 and the global stage 427 consumes the audio data without the need for synchronization, when the stages 423, 425, 427 have a common clock source. Thereafter, global stage 427 mixes the audio data generated by each local stage 423, 425 together to generate audio data for output (e.g., further processing by a renderer module).

Although the operation of the audio system has been described with reference to audio output streams (e.g., playback), it is appreciated that the audio system may also provide for processing input streams (e.g., recording). It is also appreciated that the renderer module may also include one or more local stages and a global stage.

Figure 5:
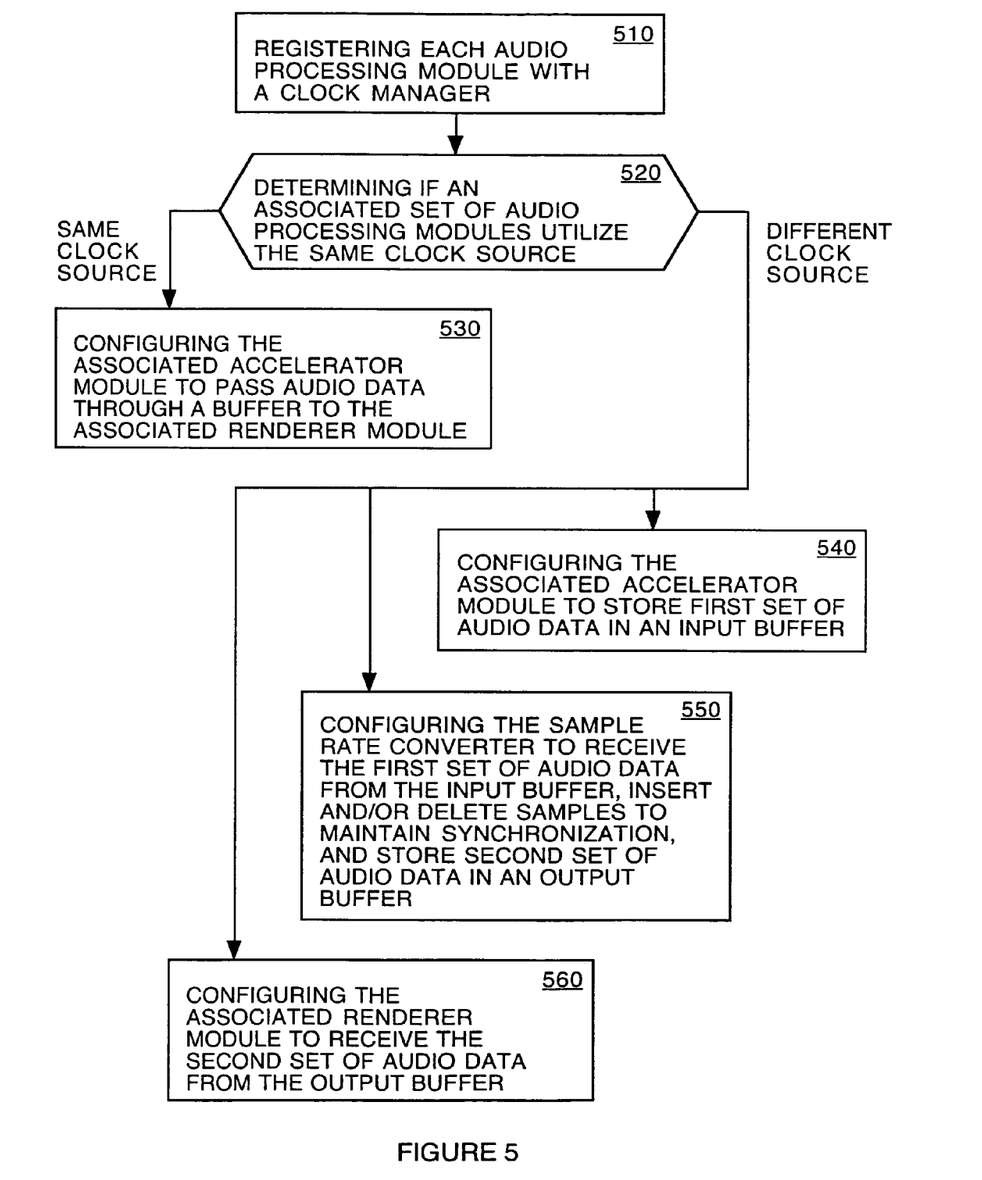
FIG. 5 shows a flow diagram of method of synchronizing audio processing modules, in accordance with one embodiment of the present invention.

Referring now to FIG. 5, a flow diagram of a computer implemented method of synchronizing audio processing modules, in accordance with one embodiment of the present invention, is shown. As depicted in FIG. 5, the method begins with each audio processing module (e.g., accelerator, renderer, local stage, global stage) registering with a clock manager, at 510. The registration process includes identification of the source clock for each audio processing module. In one implementation, each of the audio processing modules register with the clock manager by providing a global unique identifier (GUID) for instance.

At 520, the clock manager determines if the clock for an associated set of audio processing modules is from the same clock source. In one implementation, the GUID of each accelerator and renderer module identifies the clock source thereof. Similarly, the GUID of each local and global stage identifies the source clock thereof.

At 530, the clock manager configures the associated audio processing modules to operate in a first mode, if the modules operate from the same clock source. In one implementation, the associated accelerator module in configured to output its audio data to a shared portion of a buffer. The associated renderer module is configured to retrieve the audio data from the shared portion of the buffer. Similarly, the local stage is configured to output its audio data to a shared portion of the buffer. The global stage is configured to retrieve the audio data from the shared portion of the buffer.

If the audio processing modules operate from different clock sources, the clock manager of the present invention configures the associated audio processing modules and the sample rate converter to operate in a second mode. At 540, the audio generating audio processing module is configured to pass its audio data to a sample rate converter through an input portion of the buffer, when the associated audio processing modules do not utilize a common clock source. In one implementation, the accelerator module stores audio data in an input portion of the buffer. Similarly, the local stage stores audio data in an input portion of the buffer, when the local and global stages do not utilize a common clock source.

At 550, the sample rate converter is configured to synchronize the flow rates between the input and output portions of the buffer. In one implementation, when the associated accelerator and renderer modules do not utilize a common clock source, the sample rate converter retrieves audio data from the input buffer. The sample rate converter monitors the rate of audio data production by the accelerator module and the rate of consumption by the renderer module and introduces and/or eliminates extra data sample to maintain synchronization. Similarly, the sample rate converter monitors the rate of audio data production by the local stage and the rate of consumption by the global stage and introduces and/or eliminates extra data samples to maintain synchronization. After introduction and/or elimination of extra data samples, the sample rate converter outputs the audio data to an output portion of the buffer.

At 560 of FIG. 5, the audio data consuming audio processing module is configured to receive the audio data from the sample rate converter through the output portion of the buffer. In one implementation, the associated renderer module receives the audio data from the output portion of the buffer, when the accelerator and renderer module do not utilize a common clock source. Similarly, the global stage receives the audio data from the output portion of the buffer, when the local and global stages do not utilize a common clock source.

Figure 6:
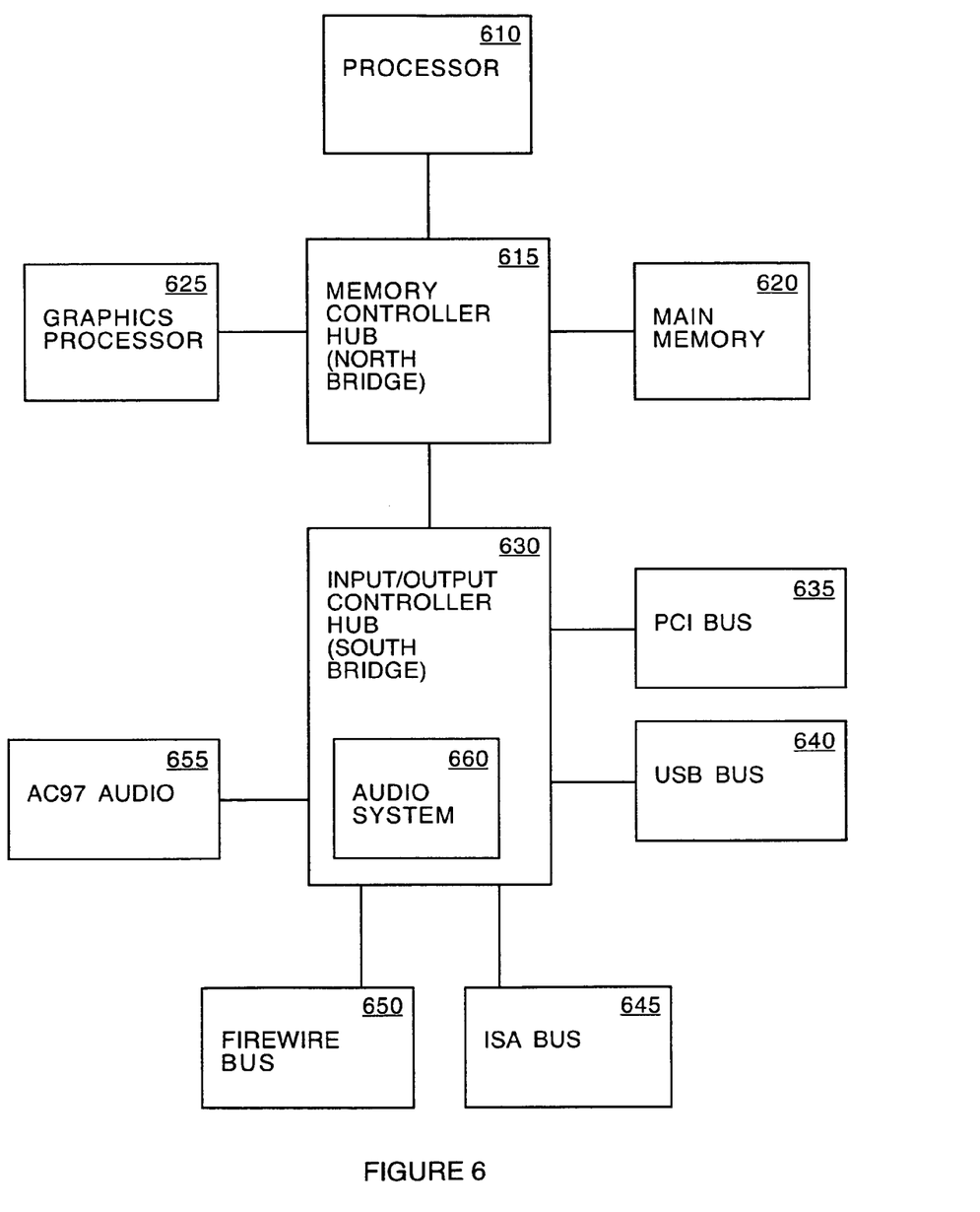
FIG. 6 shows an exemplary computing platform for implementing embodiments of the present invention.

Referring now to FIG. 6, an exemplary computing platform for implementing embodiments of the present invention is shown. Although illustrated with reference to a computing device, it is appreciated that embodiments of the present invention may be implemented in game consoles, portable gaming systems, personal digital applicances, combination set-top box/game consoles, smartphones or other mobile telephones, computer-based simulators, portable entertainment centers, or similar device that generates sound. As depicted in FIG. 6, the exemplary computing device includes a processor (CPU) 610, a memory controller hub (e.g., north bridge) 615, a main memory 620, a graphics processor (GPU) 625 and an input/output controller hub (e.g., south bridge) 630. The processor 610, the graphics processor 625, the main memory 620, and the I/O hub controller hub 630 may be communicatively coupled to the memory controller hub 615. Alternatively, the graphics processor 625 may be implemented as an integral part of the memory controller hub 615 (not shown).

The exemplary computing device may also include peripheral components, such as a display, a keyboard, a pointing device, mass data storage device(s), speaker(s), and the like, coupled to the input/output controller hub 630 by an applicable bus 635-655 (PCI bus, USB, Firewire, Ethernet, ISA bus, etc.).

The memory controller hub 615 provides for communicating information and instructions between the processor 610, the main memory 620, the graphic processor 625 and the input/output controller hub 630. The input/output controller hub 630 provides for communicating information and instructions between the memory controller hub 615 and the various input/output devices connected by the various busses 635-655. The main memory 620 provides for storage of the information and instructions. The processor 610 processes information and instructions thereby providing an operating system and one or more applications. Similarly, the graphics processor processes information and instructions thereby providing video data for display to a user.

The computing device further includes an audio system 660 in accordance with one or more of the above-described embodiments of the present invention. The audio system 660, in one implementation, is an integral part of the input/output controller hub 630. The audio system 660 includes one or more audio processing modules, a clock manager, a sample rate converter. Each audio processing module may provide one or more functions such as mixing, multi-channel conversion (e.g., stereo, surround sound), three dimensional positional computation (e.g., head related transfer functions, elevation, direction, etc.) and various effects (e.g., chorus, reverb, obstruction, occlusion, equalization, cross-talk cancellation, etc.).

The clock manager, of the audio system 660, polls the audio processing modules to determine the source of each module's clock. Thereafter, one or more of the audio processing modules (e.g., accelerator, local stage) may generate audio data while one or more audio processing modules (e.g., accelerator, local stage, renderer, global stage) consume the audio data. For example, a first audio processing module generates audio data corresponding to one or more received sounds. A second audio processing module consumes the audio data. If the first and second audio processing modules share a common clock source, the clock manager configures the first audio processing module to output the generated audio data to a shared portion of the buffer. The clock manger also configures the second audio processing module to consume the audio data from the shared portion of the buffer. If the first and second audio processing modules operate from different clock sources, the clock manager configures the first audio processing module to output the generated audio data to an input portion of the buffer. The sample rate converter is configured by the clock manger to retrieve the audio data from the input portion of the buffer and to introduce or eliminate extra data samples to maintain synchronization. The sample rate converter then outputs the audio data to an output portion of the buffer. The clock manager also configures the second audio processing module to consume the audio data from the output portion of the buffer, when the first and second audio processing modules operate from different clock sources.

The buffer of the audio system 660 may be implemented in main memory (e.g., shared memory access (SMA)) 620. The shared portion of the buffer may be approximately 1-10 KB (e.g., 64 samples, where each sample is 24 bits), while the input and output portions may be approximately 100-500 KB each. Although the buffer is described as comprising a shared portion, input portion and output portion, it is appreciated that the buffer may be implemented as a plurality of separate buffers or as a single buffer that is partitioned in accordance with the operating mode of the audio system 660.

Although the audio system 660 is described as an integral part of the input/output controller hub 630, it is appreciated that the audio system 660 may be coupled to any element that provides the audio system 660 a direct connection to main memory 620. The audio system 660 may also be implemented as an integral part of the memory controller hub. Implementation of the audio system 660 may also be distributed among one or more of the above-mention elements of the computing device. Implementation of the audio system 660 may also be distributed among one or more of the above-mentioned elements of the computing device and implemented in information and instructions residing in main memory 620 and executed by the processor 610, the memory controller hub 615 and/or the input/output controller hub. For example, an accelerator module may be implemented in software (e.g., information and instructions), the clock manager and sample rate converter may be implemented as an integral part of the input/output controller hub 630, the buffer may be implemented in the main memory 620 and the renderer module may be implemented in an audio controller.

Accordingly, the memory controller hub 615, graphic processor 625, input/output controller hub 630 and audio system 660 provide a distributed processing platform. The audio system 660 advantageously increases computing device performance by off-loading audio effects processing and rendering from the processor. Furthermore, embodiments of the present invention advantageously allow audio processing modules to act as wholly independent devices. Embodiments of the present invention advantageously synchronize the audio processing modules when they do not share a common clock source. When the audio processing modules share a common clock source, the overhead of synchronizing the audio processing modules may be eliminated by embodiments of the present invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An electronic audio system comprising:
    a buffer communicatively coupled to a first audio processing module and a second audio processing module, for storing audio data generated by said first audio processing module and consumed by said second audio processing module;
    a clock manager communicatively coupled to said first and second audio processing modules, for determining a first clock source of said first audio processing module from an identifier of said first clock source received from said first audio processing module, for determining a second clock source of said second audio processing module from an identifier of said second clock source received from said second audio processing module, and for configuring said first and second audio processing modules and a sample rate converter as a function of said first clock source and said second clock source, wherein each clock source has a different identifier; and said sample rate converter communicatively coupled to said buffer and said clock manager, for synchronizing a first flow rate of said audio data generated by said first audio processing module and a second flow rate of said audio data consumed by said second audio processing module when said first clock source is different from said second clock source.

2. The audio system according to claim 1, wherein:
said first audio processing module comprises an accelerator module; and
said second audio processing module comprises a renderer module.

3. The audio system according to claim 1, wherein:
said first audio processing module comprises a local stage; and
said second audio processing module comprises a global stage.

4. The audio system according to claim 1, wherein:
said first audio processing module comprises a first accelerator module; and
said second audio processing module comprises a second accelerator module.

5. The audio system according to claim 1, wherein:
said first audio processing module comprises a first local stage; and
said second audio processing module comprises a second local stage.

6. The audio system according to claim 1, wherein:
said first audio processing module is configured to store audio data in a shared portion of said buffer, when said first and second audio processing modules share a common clock source; and
said second audio processing module is configured to retrieve audio data from said shared portion of said buffer, when said first and second audio processing modules share said common clock source.

7. The audio system according to claim 1, wherein:
said first audio processing module is configured to store said audio data in an input portion of said buffer, when said first and second audio processing modules do not share a common clock source;
said sample rate converter is configured to retrieve said audio data from said input buffer, to modify said audio data by insert or delete an extra sample and to store said modified audio data in an output portion of said buffer, when said first and second audio processing modules do not share said common clock source; and
said second audio processing module is configured to retrieve said audio data from said output portion of said buffer, when said first and second audio processing modules do not share said common clock source.

8. The audio system according to claim 1, wherein:
said first clock source of said first audio processing module is determined from a first global unique identifier of said first audio processing module; and
said second clock source of said second audio processing module is determined from a second global unique identifier of said second audio processing module.

9. A method for synchronizing audio processing modules comprising:
registering a plurality of audio processing modules;
determining if an associated set of audio processing modules utilize a common clock source from a unique identifier received from each of said plurality of audio processing modules, wherein each clock source has a different unique identifier; and
configuring a first one of said associated set of audio processing modules to pass a first set of audio data through a first buffer to a second one of said associated set of audio processing modules, when said associated set of audio processing modules utilize said common clock source.

10. The method according to claim 9, further comprising:
configuring said first one of said associated set of audio processing modules to store said first set of audio data in a second buffer, when said associated set of audio processing modules do not utilize said common clock source;
configuring said sample rate converter to receive said first set of audio data from said second buffer, to store a second set of audio data in a third buffer and to synchronize a flow rate of said first set of audio data into said second buffer with a flow rate of said second set of audio data out of said third buffer, when said associated set of audio processing modules do not utilize said common clock source; and
configuring said second one of said associated set of audio processing modules to receive said second set of audio data from said third buffer, when said associated set of audio processing modules do not utilize said common clock source.

11. The method according to claim 10, wherein said first one of said associated set of audio processing modules generates said first set of audio data as a function of one or more received sounds.

12. The method according to claim 10, wherein said second one of said associated set of audio processing modules performs:
rendering a playback signal as a function said first set of audio data, when said associated set of audio processing modules utilize said common clock source; and
rendering said playback signal as a function of said second set of audio data, when said associated set of audio processing modules do not utilize said common clock source.

13. The method according to claim 10, wherein said second one of said associated set of audio processing modules performs:
recording an input signal as a function of said first set of audio data, when said associated set of audio processing modules utilizes said common clock source; and
recording said input signal as a function of said second set of audio data, when said associated set of audio processing modules do not utilize said common clock source.

14. The method according to claim 10, wherein said first one of said associated set of audio processing modules processes said first set of audio data.

15. The method according to claim 10, wherein said second one of said associated set of audio processing modules performs:
processing said first set of audio data, when said associated set of audio processing modules utilize said common clock source; and
processing said second set of audio data, when said associated set of audio processing modules do not utilize said common clock source.

16. A method for synchronizing audio processing modules comprising:
determining a clock source of each audio processing module of an associated set of audio processing modules from a identifier of said clock source receiver from each audio processing module, wherein each clock has a different identifier;

operating in a first mode, when an associated set of audio processing modules share a common clock source, comprising;

storing audio data generated by a first one of said associated set of audio processing modules in a shared buffer; and    receiving audio data consumed by a second one of said associated set of audio processing modules from said shared buffer; and operating in a second mode, when said associated set of audio processing modules do not share a common clock source, comprising;

storing audio data generated by said first one of said associated set of audio processing modules in an input buffer;

receiving audio data consumed by said second one of said associated set of audio processing modules from an output buffer; and    synchronizing a first flow rate of audio data being stored in said input buffer with a second flow rate of audio data being received from said output buffer.

17. The method according to claim 16, wherein said synchronizing comprises:

receiving said audio data from said input buffer;

inserting or deleting an extra sample in said audio data to generate modified audio data;

storing said modified audio data in said output buffer.

18. A computing device comprising:

a memory controller hub;

a processor communicatively coupled to said memory controller hub;

a main memory communicatively coupled to said memory controller hub; and an audio system communicatively coupled to said memory controller hub comprising;

a plurality of audio processing modules;

a sample rate converter;

a buffer communicatively coupled to said plurality of audio processing modules and said sample rate converter.

a clock manager communicatively coupled to said plurality of audio processing modules, said samples rate converter and said buffer, for determining if said plurality of audio processing modules utilize a common clock source from an identifier received from each of said plurality of audio processing modules, wherein a different identifier identifies each different clock source.

19. The computing device according to claim 18, wherein said clock manager and said sample rate converter are implemented by information and instructions stored in said main memory and processed by said processor.

20. The computing device according to claim 18, wherein at least one of said plurality of audio processing modules are an integral part of said memory controller hub.

21. The computing device according to claim 18, further comprising an input/output controller hub communicatively coupled to said memory controller hub, wherein at least one of said plurality of audio processing modules are an integral part of said input/output controller hub.

22. The computing device according to claim 18, wherein said buffer is implemented in said main memory.

* * * * *